UNITED STATES PATENT OFFICE.

LEONHARD LIMPACH, OF HOECHST-ON-THE-MAIN, GERMANY, ASSIGNOR TO THE FARBWERKE HOECHST, VORMALS MEISTER, LUCIUS & BRÜNING.

MANUFACTURE OF COLORING-MATTER.

SPECIFICATION forming part of Letters Patent No. 280,317, dated June 26, 1883.

Application filed June 6, 1882. (Specimens.)

*To all whom it may concern:*

Be it known that I, LEONHARD LIMPACH, a subject of the Emperor of Germany, residing at Hoechst-on-the-Main, in Germany, have invented a new and useful Improvement in the Manufacture of Coloring-Matters, of which the following is a specification.

This invention relates to improvements in the production of azo colors; and it consists in a novel compound consisting of a trisulpho-acid of betanaphthol—a compound which has not hitherto been produced—which furnishes very beautiful and brilliant colors when treated with diazo compounds, as hereinafter more fully set forth.

By sulphonating betanaphthol with single oleum (forming sulphuric acid) pure naphthol trisulpho-acid is produced in the following manner, to wit: one part of betanaphthol or betanaphthol mono or disulpho acid is quickly mixed with four to five parts of single oleum containing twenty per cent. $SO_3$, when the temperature of the mixture will immediately rise to a temperature of 284° to 320° Fahrenheit, (140° to 160° centigrade.) If, now, the process of sulphonating be assisted by raising the temperature to 160° centigrade during from five to ten minutes, pure trisulpho-acid will be produced. The progress of the reaction may be easily tested by treating a sample with ammonia, which will produce a greenish tint if the trisulpho-acid be present, and the solution, when brought into contact with diazoxylol, will, after standing, precipitate a coloring-matter.

Instead of forming sulphuric acid, common sulphuric acid and monochlorhydrin may be used. Either an increased temperature or a longer time of exposure will be required to produce the same reaction as that produced by the sulphuric anhydride.

When it is ascertained that the trisulpho-acid is formed, the liquid mixture containing it is allowed to run into water, and the trisulpho-acid, freed from superfluous sulphuric acid, is separated by treating the solution with chalk, filtering off the remaining liquid, and steam-drying the residual calcium salt of the betanaphthol-trisulpho-acid. This product is used either directly or as a potash or soda salt.

An alternative method of separating the trisulpho-acid is by allowing it to run into five parts of water, holding three parts of the sulphate in solution and to crystallize out. The acid salt of the betanaphthol-trisulpho-acid is thus obtained quite pure.

The following will indicate the qualities and characteristics of the betanaphthol-trisulphonic acid made in the manner herein described.

When a sample of the product is made alkaline with ammonia, a pure green fluorescence is produced, and the precipitate formed, when left standing with diazoxylol, produces a coloring-matter.

What I claim as new, and desire to secure by Letters Patent, is—

1. The process of producing a trisulpho-acid compound of betanaphthol having the qualities and characteristics herein set forth, which consists in reacting upon betanaphthol with sulphuric anhydride (or single oleum) at the temperature and for the time stated herein, then neutralizing the acid solution, when the reaction is complete, with caustic soda or a salt thereof, so as to form a salt of the above-mentioned trisulpho-acid of betanaphthol.

2. The product of the above process—a trisulpho-acid of betanaphthol made as described.

In testimony whereof I have signed my name to this specification in the presence of two subscribing witnesses.

LEONHARD LIMPACH.

Witnesses:
  F. VOGELER,
  JOSEPH PATRICK.